Patented Dec. 9, 1952

2,621,144

UNITED STATES PATENT OFFICE 2,621,144

VITAMIN $B_{12}$ RECOVERY PROCESS

Arnold J. Holland, Westfield, N. J., assignor to Merck & Co., Inc., Rahway, N. J., a corporation of New Jersey No Drawing. Application September 8, 1950, Serial No. 183,909

3 Claims. (Cl. 167—81)

This application relates to vitamin $B_{12}$, and more particularly to metal salt complexes of vitamin $B_{12}$, and to a method of utilizing these products for recovering vitamin $B_{12}$ from concentrates containing associated impurities.

Vitamin $B_{12}$, therapeutically the most potent substance yet discovered, is obtained commercially from fermentation broths from which it is isolated in extremely small amounts. Unfortunately, the process of recovering vitamin $B_{12}$ is complicated by the presence of various contaminating substances which due to their similar solubility characteristics are difficult to separate from the vitamin. Accordingly, it had been previously considered necessary to subject a vitamin $B_{12}$-containing concentrate to a chromatographic purification process on an adsorbent such as activated alumina or activated charcoal in order to remove these impurities and recover the vitamin $B_{12}$. However, such procedures are difficult to carry out on a large scale and therefore it is highly desirable to find a means of avoiding chromatographic procedures.

My present invention relates to certain metal salt-vitamin $B_{12}$ complexes, methods of preparing these products, and a process for utilizing these complexes as a means of separating vitamin $B_{12}$ from associated impurities. It is one object of my invention to provide new compositions of matter comprising water-insoluble, heavy metal salt complexes containing vitamin $B_{12}$. It is a further object to provide a process whereby these new vitamin $B_{12}$-containing complexes may be obtained. Another object is to provide a process whereby the new compositions of my invention may be utilized to separate vitamin $B_{12}$ from the impurities associated therewith in concentrates of the vitamin such as those obtained from fermentation broths.

In accordance with my invention, I have found that when certain water insoluble salts of heavy metals are formed in an aqueous solution containing vitamin $B_{12}$, the vitamin $B_{12}$ is coprecipitated with the metal salt. These precipitated metal salts containing vitamin $B_{12}$ appear to be in the nature of complexes wherein the vitamin is bound to the metal salt in some manner which is not completely understood at present. The insoluble-complex product is separated from the solution by conventional operations such as filtration or centrifugation. From the product thus isolated, the vitamin $B_{12}$ is then readily recovered by methods described in detail below.

Pursuant to a specific embodiment of my invention, I have found that these insoluble-metal salt-vitamin $B_{12}$ complexes afford a convenient and simple means for recovering vitamin $B_{12}$ from concentrates of the same wherein there is associated with said vitamin various impurities. Thus by dissolving a concentrate containing vitamin $B_{12}$ in water and precipitating a heavy metal salt therein, the vitamin is coprecipitated with the salt and the bulk of the associated impurities remain in solution. The process of this invention therefore provides a convenient and simple means for purifying vitamin $B_{12}$-containing concentrates and isolating this important product.

In general, I have found that the water insoluble salts of the heavy metals such as copper, cobalt, nickel, zinc and silver cyanides, copper and silver thiocyanates, silver and lead iodides, and silver bromide, triiodide and cyanate are useful in carrying out the process of my invention. In practice, my process is effected by precipitating these heavy metal salts in an aqueous solution containing vitamin $B_{12}$ thereby coprecipitating the vitamin with the insoluble metal salt. For example, an impure concentrate containing a minor amount of vitamin $B_{12}$ is dissolved in water, and a water soluble salt of the heavy metal, and a water soluble salt of the desired anion are added thereto causing the precipitation of the heavy metal salt containing the coprecipitated vitamin $B_{12}$. The precipitated product is removed from solution and the vitamin $B_{12}$ isolated from this product by methods described in more detail hereinafter.

Pursuant to a preferred embodiment of my invention, I have found that the heavy metal cyanides are particularly useful in my process. The use of these insoluble salts permits the recovery of substantially all of the vitamin $B_{12}$. In addition, the vitamin $B_{12}$ is readily isolated from the precipitated heavy metal cyanides. While satisfactory results are obtained with all of the heavy metal cyanides mentioned above, I have found that the use of copper and zinc cyanides to be particularly advantageous. In effecting the isolation of vitamin $B_{12}$ from concentrates by means of the copper-cyanide complex the concentrate is dissolved in water to which is then added a source of copper and cyanide ions resulting in the formation and precipitation of the copper cyanide-vitamin $B_{12}$ complex. In actual practice, I find that the vitamin $B_{12}$ is most completely precipitated when a large excess of copper cyanide is employed. The optimum amount of copper cyanide to be added will, of course, depend upon the concentration and purity of the solution from which the vitamin $B_{12}$ is to be recovered. Generally, I find that when the concentration of vitamin $B_{12}$ is very low, i. e., 1% or less, it is desirable to add a several hundred-fold excess of copper and cyanide ions per mole of vitamin $B_{12}$. With concentrates containing about 5% of vitamin $B_{12}$, a sufficient amount of copper and cyanide ions are added to the solution to form about 150 moles of cupric cyanide per mole of vitamin $B_{12}$. In addition, in order to secure an optimum recovery of vitamin $B_{12}$, I find that it is desirable to have an excess of copper ions in the aqueous solution, preferably about a 100% excess.

The maximum vitamin $B_{12}$ content of a concentrate may be conveniently determined by measuring the optical density of a sample employing light of 5500 Å wave length which is one of the characteristic peaks of absorption for pure vitamin $B_{12}$, and comparing the value obtained with the optical density of pure vitamin $$B_{12}(E^{1\%}_{1\,cm.}=63)$$

The value thus obtained is converted to a molecular value employing 1350 as the approximate molecular weight of vitamin $B_{12}$.

In carrying out the process of this embodiment of my invention, there may be employed any convenient source of copper and cyanide ions. Generally, I find it most convenient to use an alkali metal cyanide as the source of cyanide ions and a soluble copper salt such as copper sulfate as the source of the copper ions. Other obvious sources of these ions which may be utilized will be apparent to those skilled in the art.

The vitamin $B_{12}$ may be recovered from the precipitated copper cyanide-vitamin $B_{12}$ complex by any one of a number of convenient methods. One such procedure comprises adding an aqueous solution containing cyanide ions in an amount sufficient to dissolve the entire copper cyanide complex. The vitamin $B_{12}$ is then separated from this solution by extraction with an immiscible organic solvent, in which the vitamin $B_{12}$ cyanide complex formed is readily soluble, such as butanol, benzyl alcohol, a mixture of cresol and carbon tetrachloride, and the like. Another procedure for separating the vitamin $B_{12}$ from the precipitated product comprises intimately contacting the precipitate with an aqueous acid, such as a solution of acetic acid or hydrochloric acid. These acid solutions dissolve the vitamin $B_{12}$ which can then be isolated from the acidified solution by extraction with an immiscible organic solvent of the type mentioned above. Alternatively, the vitamin $B_{12}$ can be recovered from the copper cyanide-vitamin $B_{12}$ complex by direct extraction with a suitable organic solvent such as cresol or benzyl alcohol. The vitamin $B_{12}$ is then recovered from the resulting solvent extracts by conventional procedures.

When the vitamin $B_{12}$ recovered from the precipitated copper cyanide-vitamin $B_{12}$ complex still contains a considerable amount of impurities as may be the case when the starting concentrate is very impure, it may be desirable to subject the recovered product to a second purification procedure by precipitating the vitamin $B_{12}$ as the copper cyanide complex again.

In a similar manner, the zinc, cobalt, nickel, and silver cyanides can be utilized in place of the copper cyanides to effect the isolation of vitamin $B_{12}$ from concentrates thereof.

The following examples are presented to illustrate specific embodiments of my invention:

*Example 1*

A solid vitamin $B_{12}$ concentrate weighing 1.3 grams, and containing 155 mg. (11.9%) of potential vitamin $B_{12}$ was dissolved in 100 ml. of water. (This vitamin $B_{12}$ concentrate was obtained from a fermentation broth prepared by cultivating a strain of *S. griseus* by the process described in the copending application of Briggs, Denkewalter and Hughey, Serial No. 132,804, filed December 13, 1949.) To this solution was added 31 ml. of 1 M aqueous sodium cyanide solution and 31 ml. of 1 M aqueous cupric sulfate solution. A precipitate of the copper cyanide-vitamin $B_{12}$ complex formed immediately.

The precipitate was removed by filtration, washed with 30 ml. of water, and then washed with 100 ml. of 15% aqueous acetic acid. The precipitate was extracted with a total of 400 ml. of 50% aqueous acetic acid (a greater volume of more dilute acid can be employed). The extracts were then diluted with 1100 ml. of water. This solution was extracted with 650 ml. of a 1:1 mixture of cresol and carbon tetrachloride. To the solvent extract was added 1 volume of acetone and 2 volumes of ether. A precipitate formed and was removed by filtration. The precipitate was dissolved in 130 ml. of methanol, and 1000 ml. of ether was added. A precipitate formed and was removed by filtration. The precipitate weighed 380 mg. and was found to contain 140 mg. (36.8%) of potential vitamin $B_{12}$.

The 380 mg. precipitate was dissolved in 100 ml. of water, and 28 ml. of 1 M aqueous sodium cyanide solution and 28 ml. of 1 M aqueous cupric sulfate solution were added. A precipitate formed, was washed with 20 ml. of water, and was then washed with 50 ml. of 15% aqueous acetic acid. The precipitate was extracted with a total of 200 ml. of 50% aqueous acetic acid and then washed with 120 ml. of water. The extracts and washes were then diluted to 1000 ml. with water. This solution was extracted with 500 ml. of 1:1 cresol-carbon tetrachloride. To the extract was added 1 volume of acetone and 3 volumes of ether. A precipitate formed, was removed, and was dissolved in 170 ml. of methanol, and 1700 ml. of ether was added. A precipitate formed and was removed by filtration. The precipitate weighed 247 mg. and was found to contain 130 mg. (52.7%) of potential vitamin $B_{12}$.

The 247 mg. precipitate was dissolved in 0.3 ml. of water. The solution was allowed to stand overnight. The crystals that formed were removed by filtration and washed with 0.5 ml. of cold (0° C.) water. The filtrate and wash were found to contain 24.0 mg. of potential vitamin $B_{12}$. The crystals were dissolved in 9.5 ml. of water, and the solution was diluted with 110 ml. of acetone. On cooling to 0° C. and standing, crystals formed. The crystals were removed by filtration and dried. The crystals weighed 103.3 mg. and were about 95-98% pure vitamin $B_{12}$.

*Example 2*

To 100 ml. of an aqueous $B_{12}$ concentrate obtained in the process of recovering vitamin $B_{12}$ from an *S. griseus* fermentation broth source and containing about 30–40 mg. of vitamin $B_{12}$ was added 50 ml. of 2 M aqueous zinc chloride solution and 50 ml. of 1 M aqueous potassium cyanide solution. A precipitate of the zinc cyanide-vitamin $B_{12}$ complex formed immediately.

The precipitate was removed by filtration, washed with water, and then extracted with 660 ml. of 0.25 N aqueous hydrochloric acid. The acid solution was extracted successively with 132 ml. and 60 ml. of a 1-1 mixture (a three liquid phase system) of cresol and petroleum ether (30-60°). The combined solvent extracts were washed with about 500 ml. of water. To the extracts was added 190 ml. of water, and 95 ml. of n-butanol was added, which combined the solvents in one phase and transferred active material to the water layer. After separating the two phases, the solvent phase was extracted several times with water totalling 180 ml. The water extracts were combined, concentrated to a small volume, and acetone was added to precipitate active material. Examination of the precipitate indicated that substantial purification had been effected and that the vitamin $B_{12}$ had been recovered in good yield.

*Example 3*

Additional aqueous vitamin $B_{12}$ concentrates of the types described in Examples 1 and 2 were purified employing precipitations with cobaltous cyanide, nickel cyanide, and silver cyanide. In each case, a water-soluble cyanide, such as potassium cyanide, was first added to the solution containing vitamin $B_{12}$, and then a water-soluble salt of the metal employed, such as a nitrate, was added. The amounts of metal salt and cyanide employed were of the same order as those shown in Examples 1 and 2. After every precipitation, substantially all of the potential vitamin $B_{12}$ was found to have been removed from solution.

Precipitates were removed in each case by filtration, employing diatomaceous earth as filter aid. On extraction of the filter cakes with ammonium hydroxide (1-6 N strength was employed), the extracts were found to contain substantially all of the potential vitamin $B_{12}$, in all cases. The alkaline solutions were adjusted to pH 7 and then extracted with cresol-carbon tetrachloride and precipitated as described in Example 1. Significant purification, comparable to that obtained by precipitation of the copper cyanide-vitamin $B_{12}$ complex, had been effected in each case, with little apparent loss of vitamin $B_{12}$.

Various changes and modifications may be made in my invention, certain preferred embodiments of which are herein described, without departing from the scope thereof. It is my intention that such changes and modifications, to the extent that they are within the scope of the appended claims, will be construed as part of my invention.

I claim:

1. A process for recovering vitamin $B_{12}$ from an aqueous solution containing vitamin $B_{12}$ and associated impurities which comprises forming copper cyanide in said vitamin $B_{12}$-containing solution thereby precipitating a copper cyanide-vitamin $B_{12}$ complex, separating said insoluble complex, and recovering vitamin $B_{12}$ in substantially purer form from said complex.

2. A process for recovering vitamin $B_{12}$ from an aqueous solution containing vitamin $B_{12}$ and associated impurities which comprises forming zinc cyanide in said vitamin $B_{12}$-containing solution thereby precipitating a zinc cyanide-vitamin $B_{12}$ complex, separating said insoluble complex, and recovering vitamin $B_{12}$ in substantially purer form from said complex.

3. A process for recovering vitamin $B_{12}$ from an aqueous solution containing vitamin $B_{12}$ and associated impurities which comprises forming an insoluble metal cyanide selected from the group consisting of copper, cobalt, nickel, zinc, and silver cyanides in said vitamin $B_{12}$ containing solution, thereby precipitating an insoluble metal cyanide-vitamin $B_{12}$ complex, separating said insoluble complex, and recovering vitamin $B_{12}$ from said complex.

ARNOLD J. HOLLAND.

REFERENCES CITED

The following references are of record in the file of this patent:

UNITED STATES PATENTS

| Number | Name | Date |
|---|---|---|
| 2,530,416 | Wolf | Nov. 21, 1950 |

OTHER REFERENCES

Whitmore: Organic Chemistry (1937), pages 496, 497, 505.